MAGNETIC TAPE DEGAUSSING UNIT

Filed March 29, 1967 3 Sheets-Sheet 1

INVENTOR.
MILTON A. McKINLEY
BY Laurence I. Lerner
ATTORNEY

April 14, 1970 M. A. McKINLEY 3,506,884

MAGNETIC TAPE DEGAUSSING UNIT

Filed March 29, 1967 3 Sheets-Sheet 2

INVENTOR.
MILTON A. McKINLEY

BY Laurence I. Lerner

ATTORNEY

INVENTOR.
MILTON A. McKINLEY
BY Laurence I. Lerner
ATTORNEY

United States Patent Office 3,506,884
Patented Apr. 14, 1970

3,506,884

MAGNETIC TAPE DEGAUSSING UNIT

Milton A. McKinley, 24 E. Columbia Ave., Palisades Park, N.J. 07650

Filed Mar. 29, 1967, Ser. No. 632,496
Int. Cl. H01f *13/00;* H01h *47/00*
U.S. Cl. 317—157.5 13 Claims

ABSTRACT OF THE DISCLOSURE

The invention is directed to a degaussing unit for magnetic tapes which comprises a closed coil with an air core in which the magnetic flux lines are, at their maximum, inside the air core in a direction perpendicular to the opening in the center of the coil. Magnetic tapes are passed through the center of the coil by various transportation means so that the flat surface of the tape will be perpendicular to the lines of magnetic flux. It has been determined that the degaussing effect on the magnetic tape is maximum where the lines of flux are perpendicular to the flat surface and is minimum where the lines of flux are parallel to the surface of the tape. Accordingly, in order to degauss the tape on a reel, the transportation means is operative in one embodiment to spin the reel within the air core so as to degauss the entire reel and in another embodiment, two coils are provided at 90 degrees with respect to each other and the reels are passed through the air cores by a conveyor belt extending through the two coils. In this way, as the conveyor belt transports the reels, first the reels will be degaussed in one direction and then when passing through the second coil, the reels will be degaussed in a direction perpendicular to the first direction.

In order to insure that the maximum flux is provided in a direction through the center of the core, and to avoid leakage flux in the surrounding air, the coil has a magnetizable non-continuous strip on its outer surface so as to concentrate the flux through the air core.

BACKGROUND OF THE INVENTION

In the past, when it was desirable to remove all signals from a magnetic tape through the use of degaussing apparatus, the apparatus usually consisted of a wound magnetic core with an air gap between opposed pole faces. The tape to be degaussed was passed between the opposed pole faces within the air gap. The efficiency of this type of degaussing was very low and it was difficult to obtain anything more than superficial degaussing of the tape. Thus, it had been thought desirable to degauss the tape whereby the signals thereon were removed to a level less than 50 db. In order to possibly operate at this efficiency, the prior art systems required that the flux within the air gap be at an extremely high level which required excessive voltage on the coil. Normally, they were unable to reach such levels and, when driven sufficiently to achieve such levels, the voltage on the magnetic core windings was so high that it gave rise to other problems such as corona discharge, overheating of the coil, and the necessity for heavy shielding of the high voltage windings. This was all due to the fact that there was no recognition that the most effective degaussing occurred when the magnetic lines of flux were perpendicular to the flat surface of the tape rather than the edge surfaces of the tape.

It would further be understood that when a one inch tape reel was to be degaussed, it must be degaussed outside of the box within which it had been packaged in order to maintain the air gap at a minimum. Thus, if the reel were to be degaussed while in a box, this would add approximately ½ inch to 1 inch in thickness and therefore the air gap would have to be ½ inch to 1 inch larger. With this increased air gap, the voltage requirements rose substantially in order to achieve the desired flux within the air gap. Thus there were no machines on the market which could simply and easily degauss a reel within a box whose over-all thickness was 2 inches.

SUMMARY OF THE INVENTION

The invention comprises, in one embodiment, two coils each having an air core and being aligned with each other so that a conveyor belt will pass through the air cores. The coils are arranged respectively as 45 degrees and 135 degrees with respect to the path of travel on the conveyor. The coils are wound so that the magnetic flux generated by the coil will be transmitted perpendicular to the pane of the coil and through the air core. Each of the coils has a non-continuous magnetic strip on its outer surface so as to concentrate the flux through the air core and cut down on leakage flux outside of the coil. It has been found that the portion of magnetic tape positioned within the core having its flat surface perpendicular to the lines of flux will be degaussed whereas those surfaces which are substantially parallel to the lines of flux will not be degaussed. Accordingly, by positioning the coils as discussed above, a tape transported by the conveyor through the air cores of the two coils will first be degaussed in one direction and, then, degaussed in a second direction perpendicular to the first direction. Thus the entire reel of magnetic tape will be degaussed after passing through the two coils. Because of the maximum efficiency in degaussing achieved by the present invention, it is possible to degauss to a level less than minus 60 db without the requirement of high voltage on the coils. Since the air core can be substantially large, even greater than 2 inches for example, the degaussing unit can take large tape reels, even those already packaged in boxes.

In the second embodiment of the present invention, the same basic principle is utilized for smaller reels where individual tape reel degaussing is desired. In this embodiment, a tape reel is mounted on a small turntable and transported so that a major portion of the reel fits within the air core of a coil designed in accordance with the principles of the present invention. The turntable is rotated causing the reel to rotate within the air core so that the entire reel is degaussed, and then the reel is transported away from the coil for removal.

For the purpose of illustrating the invention, there are shown in the drawings forms which are presently preferred; it being understood, however, that this invention is not limited to the precise arrangements and instrumentalities shown.

Figure 1:
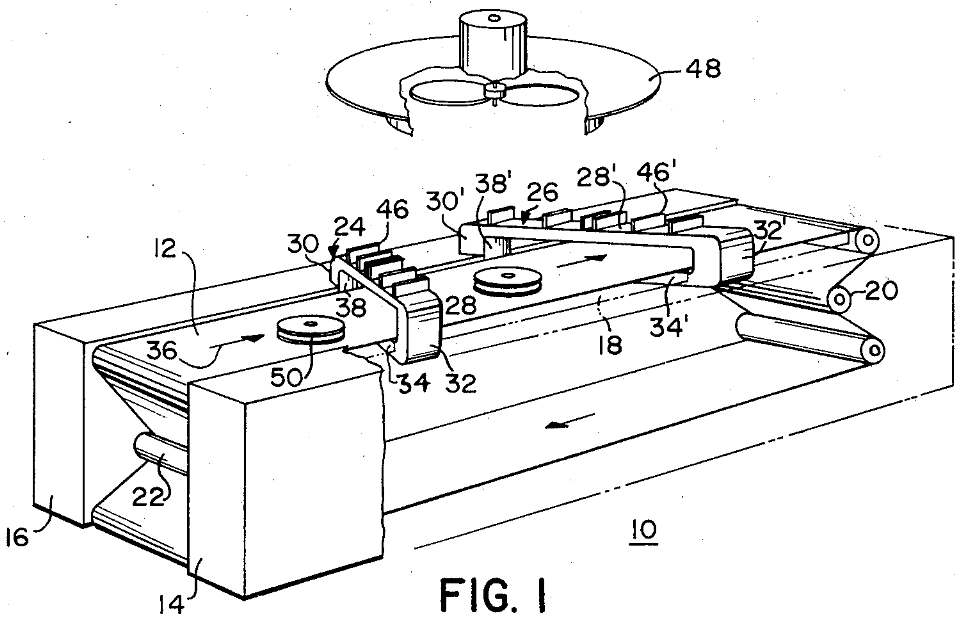
FIGURE 1 is a perspective view of the first embodiment of the present invention.

In FIGURE 1, there is shown the apparatus of the present invention generally designated by the numeral 10. The degaussing apparatus 10 comprises a conveyor belt 12 mounted between two supports 14 and 16. The conveyor belt 12 is driven by a motor (not shown) and extends over a flat support 18 extending between the parallel standards 14 and 16. The conveyor belt continues over roller assemblies 20 and 22 at opposite ends of the apparatus 10. It will thus be understood that the conveyor belt 12 has a flat horizontal portion which rests on the flat support 18. The support 18 extends between the standards 14 and 16 from roller assembly 20 to roller assembly 22.

Two coils 24 and 26 are positioned along the path of the conveyor belt 12. The coils 24 and 26 are substantially identical in construction and, therefore, similar parts of coil 24 will be noted with prime numerals when associated with coil 26. Coils 24 and 26 are each substantially rectangular in shape having upper horizontal legs 28 and 28' and short vertical side legs 30, 32 and 30', 32'. The coils 24, 26 are respectively positioned 45 degrees and 135 degrees with respect to the side support 16. Thus, there is a 90 degree angle between the coils 24 and 26 as can best be seen in FIGURE 2. The upper horizontal legs 28 and 28' of coils 24 and 26 are each of a length sufficient so that the coils 24 and 26 extend between supports 16 and 14 with the vertical legs 30, 32 and 30', 32', positioned within the supports 16 and 14 and remaining clear of the flat horizontal bed 18 on which the conveyor belt 12 is moving. The bottom horizontal leg 34 of the coil 24 and the bottom horizontal leg 34' of coil 26 are each positioned within suitable cut out portions of the flat horizontal bed 18 with the inside surface of bottom horizontal leg 34' being flush with the upper surface of the flat horizontal support 18 so that the conveyor belt 12 moves easily thereacross without interference.

As stated previously, the coils 24 and 26 are positioned at 90 degree angles with respect to each other. The coils 24 and 26 are at 45 degree and 135 degree angles respectively to the path of travel of the conveyor 12. The conveyor 12 is moving in a direction as noted by the arrow 36. Further, it should be noted that the conveyor belt 12 is passing through the opening 38 and the opening 38' which form the air cores of the coils 24 and 26 respectively. The air cores 38 and 38' are defined respectively by the legs 28, 30, 32, 34 and 28', 30', 32', 34'.

Figure 3:
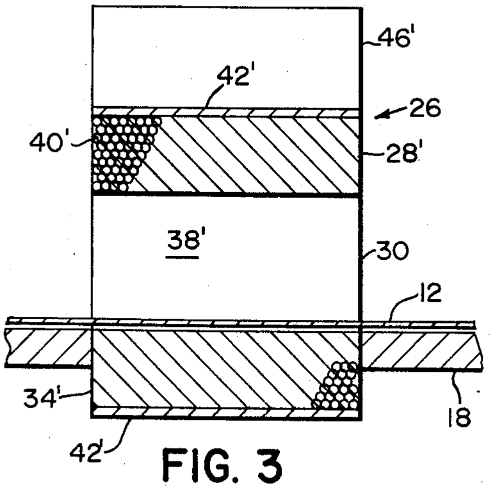
FIGURE 3 is a cross-sectional view of the embodiment of FIGURES 1 and 2 taken along lines 3—3 of FIGURE 2.

The coils 24 and 26 are formed by continuously wound copper wire 40' wound in turns which conform in shape to the air core 38' as shown in FIGURE 3. These turns of current windings, when connected to a source of alternating current, produce a magnetizing flux which extends perpendicularly about the legs 28', 30', 32' and 34' and is generally concentrated through the air core 38' in a direction perpendicular to the plane of the coil 26 or at an angle of 45 degrees with respect to the direction of travel 36 of the conveyor 12. Similarly, current in the copper wire current windings forming the coil 24 will produce a flux concentrated through the air core 38 generally perpendicular to the plane of the coil 24 at an angle of 135 degrees with respect to the direction of travel 36 of the conveyor 12. The coils 24 and 26 each have, on their outer surface a non-continuous strip of magnetizable material such as steel strips 42 and 42'. Strip 42' is shown in FIGURE 3 as extending about the entire outer surface of the coil 26. This strip 42' does not completely encircle the coil 26 but rather is joined, on the top of the coil 26 on the surface of leg 28' by an insulating joint 44'. The strip 42 is joined by an insulating joint 44 on the top of leg 28 of coil 24. It will be understood that the non-continuous magnetic strip 42 and 42' could be in the form of a convolute of magnetic strip material having insulation between turns rather than the form shown. However, it has been found that a single, turn is sufficient to achieve the objects of the present invention which are to limit leakage flux outside of the coils 24 and 26 and to concentrate the magnetic path within the air cores 38 and 38'.

On the upper surface of the legs 28 and 28' there are provided a plurality of heat exchange members 46 and 46'. These heat exchange members 46 and 46' are electrically insulated from the strip 42 and act merely to conduct heat from the coils 24 and 26. The entire coils 24 and 26 are each separately insulated by dipping the coils in a potting compound and setting the potting compound about the coils so as to insulate them from their environment.

A housing is placed over the coils 24 and 26, which housing will have an exhaust fan 48 in its upper wall so as to aid in the cooling of the coils 24 and 26. If desired, the exhaust fan 48 can be temperature controlled.

Figure 2:
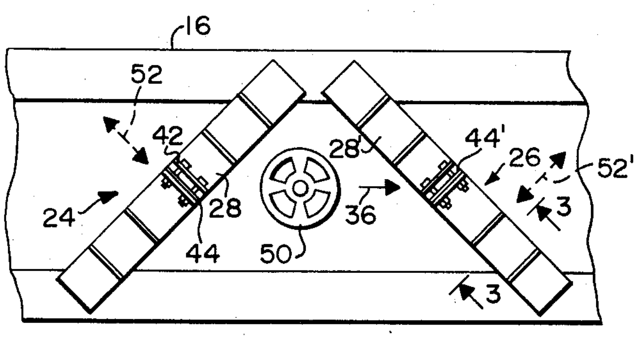
FIGURE 2 is a top plan view of the embodiment of FIGURE 1.

The apparatus of FIGURES 1–3 is operative to degauss magnetic tapes 50 in the following manner.

The coils 24 and 26 are energized by supplying alternating current at ordinary line voltage to the coils which will create magnetic fluxes in the air cores 38 and 38'. The flux paths in air cores 38 and 38' will be respectively at 135 degrees and 45 degrees to the direction of travel 36 of the tapes 50. The direction of the magnetic flux path associated with coils 24 is shown by dotted arrow 52 and the direction of the magnetic flux path associated with coil 26 is shown by the dotted line arrow 52' in FIGURE 2. As it was stated previously, perpendicular these flat surfaces of the tape wound on the reels 50 which are perpendicular to the magnetic flux path will be degaussed whereas those flat surfaces of the tape which are parallel to the flux path will not be degaussed. Accordingly, as the reel 50 is conveyed on the belt 12 through the air cores 38 and 38', it will first be degaussed in a direction 135 degrees with respect to the path of travel 36 and then when passing through the air core 38', will be degaussed in a direction 45 degrees with respect to the path of travel. Thus, the tape will be degaussed in one direction and then in a direction perpendicular to the first direction. This will effectively degauss the entire surface of the magnetic tape wound on the reel 50. It has been found that where the air cores 38 and 38' are slightly greater than 2 inches in height, with approximately 5000 ampere turns being supplied to the coils 24 and 26, the tape 50 will be degaussed to a level less than minus 60 db. In fact, the tapes are so clean of signal that it is almost impossible to measure the remaining signal on the tapes. These figures were taken in one embodiment where the conveyor 12 was moving at approximately 18 to 20 feet per minute. In fact, it has been found that with even a minimum of 3000 ampere turns, it is possible to obtain a 50 db degaussing effect on tapes in the apparatus of FIGURES 1–3 and this is far more efficient than any existing degaussing apparatus. Further, it will be noted that the conveyor 12 could be the end of the manufacturing line for manufacturing the tapes and that the apparatus 10 can therefore be part of an automated tape manufacturing system. Still further, because of the 2 inch gap provided by the air cores 38 and 38' the tape 50 could even be packaged prior to placement on the conveyor 12. Thus, even a 1 inch thick tape packaged in a carton could be accommodated by the apparatus 10. There is obviously no need for adjustment of the apparatus for different sizes and thickness of tape to be degaussed.

Figure 4:
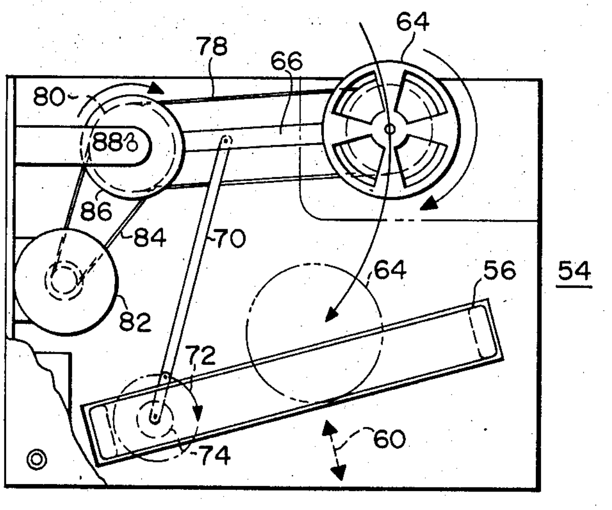
FIGURE 4 is a top plan view of a second embodiment of the present invention.
Figure 5:
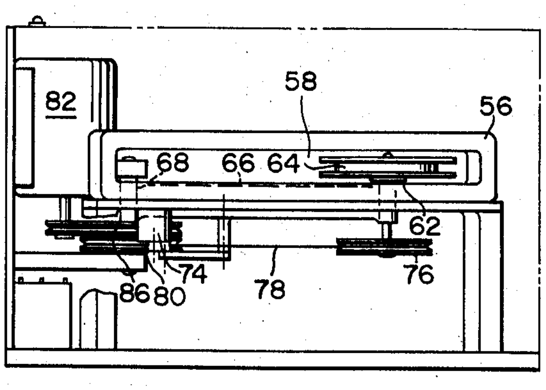
FIGURE 5 is a front plan view of the embodiment of FIGURE 4.
Figure 6:
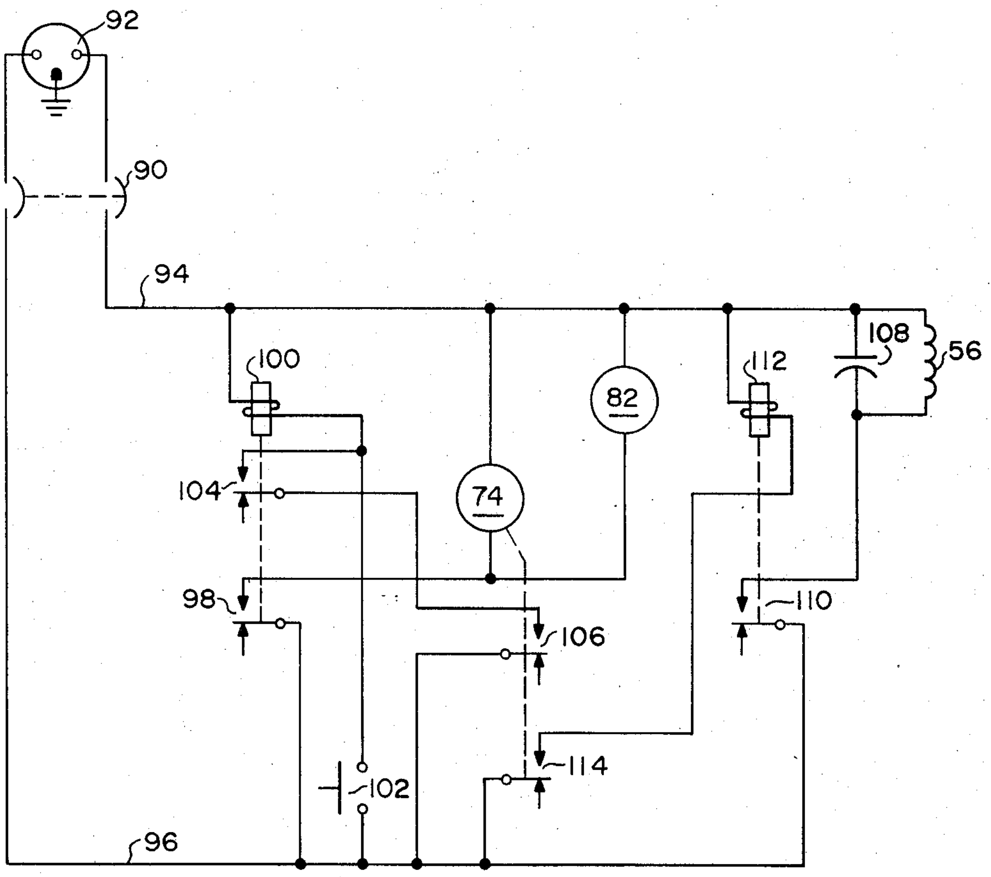
FIGURE 6 is a schematic wiring diagram of a circuit utilized to control the apparatus of FIGURES 4 and 5.

In FIGURES 4–6 there is shown a second embodiment of the present invention generally designated by the numeral 54. The apparatus 54 is intended to degauss smaller tapes individually, without the need for two separate degaussing coils as was required in the embodiment of FIGURES 1–3. In the apparatus of FIGURE 4 there is provided a coil 56 similar in all respects to the coils 24 and 26 of FIGURES 1–3. The coil 56 is slightly smaller dimensionally as the apparatus 54 is intended to be utilized with smaller tapes which are not in their package. The coil 56 will have its flux concentrated through its air core 58 in a direction perpendicular to the air core as noted by the dotted arrow 60. A reel of magnetic tape 64 will be mounted on a turntable 62 and drawn adjacent the coil 56 so that a major portion of the tape reel 64 can be positioned with the air core 58. The tape reel 64 will be rotated within the air core 58 so that all surfaces of the magnetic tape will, at one time, be perpendicular to the direction 60 of the magnetic flux path created by the coil 56.

The turntable 62 is mounted on an arm 66 which is pivotally mounted about an axis 68. The arm 66 is moved about the axis 68 by a second arm 70 pivotally connected at one end to the arm 66 and at the other end to a crank 72 driven by a timer motor 74. Rotation of the timer motor 74 will draw the arm 66 toward the coil 56 so that, as shown in dotted lines, the tape reel 64 will come adjacent the coil 56 and then will be withdrawn to the position shown in FIGURE 4. The turntable 62 is mounted for driving by a pulley 76 connected through a belt 78 to a second pulley 80 driven by a motor 82 through a second belt 84 and third pulley 86. The pulleys 86 and 80 are mounted on the same shaft 88.

In FIGURE 6, there is shown the control circuitry for the apparatus FIGURES 4 and 5. The apparatus of FIGURE 6 includes circuit breakers 90 which are connected to the source 92 of electrical power. The circuit breakers 90 control power in lines 94 and 96. The turntable motor 82 is connected across lines 94 and 96 through the contacts 98 (normally open) of relay 100. Relay 100 is connected across lines 94 and 96 through an on-off start up switch 102 and contact 104 and 106 in parallel with on-off switch 102. Contacts 104 which are normally open are controlled by relay 100 and contacts 106 which are normally open are controlled by timer motor 74. Timer motor 74 is also connected across the lines 94 and 96 through contacts 98.

The coil 56 is in parallel with a tuning capacitor 108. Coil 56 and its tuning capacitor 108 are connected across lines 94 and 96 through normally open contacts 110 controlled by relay 112. The relay 112 is connected between lines 94 and 96 through contacts 114 controlled by the timer motor 74.

In operation, a tape reel 64 is placed on the turntable 62 and on-off switch 102 is temporarily closed. This energizes coil 100 closing contacts 104 and 98. Closing contacts 98 energizes turntable motor 82 and timer motor 74. Energization of timer motor 74 closes contacts 106 and 114. The closing of contact 106 completes the circuit through contacts 104 to hold the relay 100 in its closed position. Further, the closing of contacts 114 energizes relay 112 to close contacts 110. The closing of contacts 110 completes the circuit to energize coil 56.

Thus, by pushing start up button 102, coil 56 is energized as well as timer motor 74 and turntable motor 82. Thus the turntable 62 is rotated and moved into position so that the tape 64 will have the major portion thereof placed inside the air core 58 of the coil 56 and rotated therein to degauss the tape 64. Then, as the timer motor 74 continues to rotate, the turntable 62 is moved back to its original position as shown in FIGURE 4. At that time, the timer motor 74 causes its contacts 106 and 114 to open. The opening of contacts 114 deenergizes relay 112, opening its contact 100 and thus causing coil 56 to be deenergized. Openings of contacts 106 deenergizes relay 100 to causing its holding contact 104 to open and further opening contacts 98. The opening of contacts 98 deenergizes the timer motor 74 and the turntable motor 82. The tape 64 can then be removed from the turntable 62 and the apparatus 54 is ready for the next tape to be degaussed. It will be understood that no adjustments need be made for various sizes of tapes with the apparatus being limited only by the height of the air core 58 and the size thereof.

The present invention may be embodied in other specific forms without departing from the spirit or essential attributes thereof.

I claim as my invention:

1. Degaussing apparatus for magnetic tape reels, said apparatus comprising a magnetic flux inducing means, said magnetic flux inducing means inducing magnetic flux in at least one predetermined path, magnetic tape reel transporting means, said magnetic tape reel transporting means being operative to feed a magnetic tape reel to said magnetic flux inducing means so that the flat surface of all of the tape on the reel will be perpendicular to a major portion of the path of flux induced by said magnetic flux inducing means, said magnetic flux inducing means including at least one coil, said coil comprising a plurality of current windings wound concentrically to define an air core, said coil being adapted to be connected to a source of electric power, said coil, when connected to a source of electric power, being operative to induce a magnetic flux having a major portion thereof within said air core in a direction perpendicular to the plane of said coil, said magnetic tape reel transporting means being operative to feed a tape reel so that at least a major portion of said tape reel is positioned within said air core with the flat surface of tape wound on the tape reel being perpendicular to a major portion of the path of the magnetic flux induced by said coil, said magnetic tape reel transporting means being operative to rotate a magnetic tape reel when a major portion of the tape reel is inside of said air core so that the entire surface of the magnetic tape wound on said reel is, at various times during rotation, perpendicular to a major portion of the path of magnetic flux induced by said coil to thereby degauss all of the magnetic tape wound on the reel.

2. The degaussing apparatus of claim 1 wherein said magnetic tape reel transporting means includes a turntable, said turntable being adapted to support a magnetic tape reel for degaussing, drive means for said turntable operative to cause rotation of said turntable, turntable support means, said turntable support means being operative to transport said turntable to said air core and return said turntable to its initial position.

3. The degaussing apparatus of claim 2 including control means, said control means being operative to connect said coil to electric power, initiate operation of said turntable support means and said turntable drive means when a magnetic tape reel is placed on said turntable for degaussing; and to disconnect said coil from its source of electric power, and to stop operation of said turntable support means and said turntable drive means after the degaussing operation is completed.

4. The degaussing apparatus of claim 1 wherein said coil is rectangular in cross-section, said air core being also substantially rectangular in shape, the shorter legs of said air core being approximately 1 to 3 inches in height.

5. The degaussing apparatus of claim 4 wherein said air core shorter legs are approximately 2 inches in height, said coil being designed for operation at approximately 5000 ampere turns.

6. Degaussing apparatus for magnetic tape reels, said apparatus comprising a magnetic flux inducing means, said magnetic flux inducing means inducing magnetic flux in at least one predetermined path, magnetic tape reel transporting means, said magnetic tape reel transporting means being operative to feed a magnetic tape reel to said magnetic flux inducing means so that the flat surface of all of the tape on the reel will be perpendicular to a major portion of the path of flux induced by said magnetic flux inducing means, said magnetic flux inducing means including at least one coil, said coil comprising a plurality of current windings wound concentrically to define an air core, said coil being adapted to be connected to a source of electric power, said coil, when connected to a source of electric power, being operative to induce a magnetic flux having a major portion thereof within said air core in a direction perpendicular to the plane of said coil, said magnetic tape reel transporting means being operative to feed a tape reel so that at least a major portion of said tape reel is positioned within said air core with the flat surface of tape wound on the tape reel being perpendicular to a major portion of the path of the magnetic flux induced by said coil, a discontinuous magnetic strip wound on the outside surface of said coil concentric with said current windings, said discontinuous magnetic strip being operative to minimize leakage flux and to concentrate said flux within said air core.

7. Degaussing apparatus for magnetic tape reels, said apparatus comprising a magnetic flux inducing means, said magnetic flux inducing means inducing magnetic flux in at least one predetermined path, magnetic tape reel transporting means, said magnetic tape reel transporting means being operative to feed a magnetic tape reel to said magnetic flux inducing means so that the flat surface of all of the tape on the reel will be perpendicular to a major portion of the path of flux induced by said magnetic flux inducing means, said magnetic flux inducing means including at least one coil, said coil comprising a plurality of current windings wound concentrically to define an air core, said coil being adapted to be connected to a source of electrical power, said coil, when connected to a source of electric power, being operative to induce a magnetic flux having a major portion thereof within said air core in a direction perpendicular to the plane of said coil, said magnetic tape reel transporting means being operative to feed a tape reel so that at least a major portion of said tape reel is positioned within said air core with the flat surface of tape wound on the tape reel being perpendicular to a major portion of the path of the magnetic flux induced by said coil, a second coil similar to said first mentioned coil, support means for said first mentioned and second coils, said support means positioning said coils at right angles to one another, said magnetic tape reel transporting means being operative to feed a magnetic tape in a straight line through the air cores of said first mentioned and second coils, so that the flat surface of magnetic tape on a reel will be degaussed in a first direction when passing through said first mentioned coil air core and in a second direction perpendicular to said first direction when passing through said second coil air core.

8. The degaussing apparatus of claim 7 wherein said coil is rectangular in cross-section, said air core being also substantially rectangular in shape, the shorter legs of said air core being approximately 1 to 3 inches in height.

9. The degaussing apparatus of claim 7 wherein said magnetic tape transporting means is a conveyor belt, said conveyor belt passing through the air cores of said first mentioned and second coils, said first mentioned and second coils being respectively at 45 degree and 135 degree angles with respect to the path of travel of said conveyor.

10. The method of degaussing magnetic tape wound on tape reels comprising the steps of inducing a magnetic flux having the major portion thereof in a predetermined path, feeding a magnetic tape wound on a reel so that the flat surface of the tape is perpendicular to the flux path and transporting the tape with respect to the magnetic flux path so that all of the surfaces of the magnetic tape of the reel are perpendicular to the path of the major portion of the induced flux to thereby degauss all of the magnetic tape, said step of inducing a magnetic flux comprising the steps of providing a coil wound concentrically about and defining an air core and supplying the coil with electric power to induce a magnetic flux about the coil with a major portion thereof within the air core in a direction perpendicular to the plane of the coil, said step of feeding a magnetic tape wound on a reel including transporting at least a major portion of the reel into the air core of the coil, the step of feeding the magnetic tape wound on the reel including revolving the tape while at least a major portion of the reel is within the air core so that the entire flat surface of the magnetic tape will, at one time, be perpendicular to the direction of the magnetic flux induced by the coil.

11. The method of degaussing magnetic tape wound on tape reels comprising the steps of inducing a magnetic flux having the major portion thereof in a predetermined path, feeding a magnetic tape wound on a reel so that the flat surface of the tape is perpendicular to the flux path and transporting the tape with respect to the magnetic flux path so that all of the surfaces of the magnetic tape of the reel are perpendicular to the path of the major portion of the induced flux to thereby degauss all of the magnetic tape, said step of inducing a magnetic flux comprising the steps of providing a coil wound concentrically about the defining an air core and supplying the coil with electric power to induce a magnetic flux about the coil with a major portion thereof within the air core in a direction perpendicular to the plane of the coil, said step of feeding a magnetic tape wound on a reel including transporting at least a major portion of the reel into the air core of the coil, the step of inducing the magnetic flux including providing a second coil similar to the first mentioned coil, said step of feeding including transporting the magnetic tape wound on the reel through the air core of the first mentioned coil with the plane of the coil in a first direction relative to the direction of transporting, and then transporting the tape wound on the reel through the second coil with the plane of the second coil being in a second direction with respect to the direction of transporting, the first and second directions being mutually perpendicular to one another.

12. The method of degaussing magnetic tapes wound on reels of claim 11 wherein said step of inducing magnetic flux includes positioning the two coils at right angles to one another and feeding the tape reel on a straight line path through the air cores of both coils.

13. The method of degaussing magnetic tape wound on reels of claim 12 wherein said step of inducing magnetic flux includes inducing magnetic flux of approximately 5000 ampere turns in each of said coils, providing each of said coils with air cores having a height of at least 2 inches, and transporting the magnetic tape wound on the reel through said air cores at a rate of approximately 28 feet per minute.

References Cited

UNITED STATES PATENTS

| | | | |
|---|---|---|---|
| 2,526,358 | 10/1950 | Howell | 317—157.5 XR |
| 2,848,660 | 8/1958 | Boyers | 317—157.5 |
| 3,023,280 | 2/1962 | Tronslin et al. | 317—157.5 XR |
| 3,078,396 | 2/1963 | Engelsted | 317—157.5 |
| 3,143,689 | 8/1964 | Hall | 317—157.5 |
| 3,329,872 | 7/1967 | Amos | 317—157.5 |

LEE T. HIX, Primary Examiner

W. M. SHOOP, JR., Assistant Examiner